(12) United States Patent
Azpiroz Villar

(10) Patent No.: US 8,779,613 B2
(45) Date of Patent: Jul. 15, 2014

(54) SYSTEM FOR GENERATION ENERGY FROM OCEAN WAVE MOVEMENT

(76) Inventor: Francisco Azpiroz Villar, San Sebastian (ES)

(*) Notice: Subject to any disclaimer, the term of this patent is extended or adjusted under 35 U.S.C. 154(b) by 36 days.

(21) Appl. No.: 13/641,552

(22) PCT Filed: Mar. 7, 2011

(86) PCT No.: PCT/ES2011/070147
§ 371 (c)(1),
(2), (4) Date: Oct. 16, 2012

(87) PCT Pub. No.: WO2011/131811
PCT Pub. Date: Oct. 27, 2011

(65) Prior Publication Data
US 2013/0038064 A1 Feb. 14, 2013

(30) Foreign Application Priority Data
Apr. 22, 2010 (ES) .................................. 201030593

(51) Int. Cl.
*F03B 13/12* (2006.01)
(52) U.S. Cl.
USPC .......................................................... 290/53
(58) Field of Classification Search
USPC ............................................. 290/53, 52, 42
See application file for complete search history.

(56) References Cited

U.S. PATENT DOCUMENTS

| 1,540,364 | A | | 6/1925 | Roldan G Benjamin |
| 4,210,821 | A | | 7/1980 | Cockerell |
| 4,389,843 | A | | 6/1983 | Lamberti |
| 4,792,290 | A | | 12/1988 | Berg |
| 5,132,550 | A | * | 7/1992 | McCabe ........................ 290/53 |
| 2010/0038913 | A1 | * | 2/2010 | Svelund ........................ 290/53 |
| 2011/0121572 | A1 | * | 5/2011 | Levchets et al. ................ 290/53 |
| 2012/0153627 | A1 | * | 6/2012 | Jo ................................. 290/53 |

FOREIGN PATENT DOCUMENTS

| DE | 2751538 | 5/1979 |
| GB | 2113311 | 8/1983 |

* cited by examiner

*Primary Examiner* — Michael Zarroli
(74) *Attorney, Agent, or Firm* — Lucas & Mercanti, LLP

(57) ABSTRACT

The invention relates to a system for generating energy from ocean wave movement, comprising at least: one vessel (2) having at least one rotor shaft (3) that acts on an electricity generator; at least one tank (5) which is joined and solidly connected to the vessel (2) and which is full of sea water such that it remains at the water line (f); at least one float (1) joined to the vessel (2) by means of a boom (11); and mechanical means for transmitting the movement of the float (1) to the corresponding rotor shaft (3). In addition, the vessel (2) is attached to a float frame (4). A plurality of vessels (2) can be connected to a float frame (4) and/or a plurality of float frames (4) can be connected to one another. Furthermore, one or more tanks (5) can be attached to said float frames.

9 Claims, 3 Drawing Sheets

SYSTEM FOR GENERATION ENERGY FROM OCEAN WAVE MOVEMENT

This is a U.S. National Phase Application under 35 U.S.C. 371 of International Application PCT/ES2011/070147, filed on Mar. 7, 2011, which claims the priority of Spanish Application No. P201030593, filed Apr. 22, 2010, the entire content of both Applications are hereby incorporated by reference.

The object of the invention refers to a generator of power from sea wave movement, seeking economy in its construction, transport, installation and maintenance.

To obtain power from sea waves, a floating element (buoy) is necessary, which is displaced in relation to a point, which makes it possible to frame the reference of the movement.

There are three possible ways to fix this point of reference:
a) The terra firma, in which case, there are floats or buoys that move with the movement of the waves and transmit this movement through arms to a generator that is on land;
b) To fix the movement in relation to the sea floor, so that the buoys or floats move in relation to a structure fastened to the sea floor, and
c) That the reference would also be a floating element, so that one part of reference descends, the other ascends and vice versa depending on the period of the wave. If a mobile reference point is fixed, it must have sufficient mass—that is, weight—to define the force between the two moving parts.

The system that is the object of the invention consists basically of at least one vessel, in which there are placed tanks, attached laterally to it and placed immediately below the waterline. These tanks are filled with water and, once at sea, act as ballast at the time of receiving the thrust of the buoys that are fastened by arms on both sides of the vessel. These buoys, due to the movement of the waves, rise and fall in relation to the vessel acting on a shaft that moves the generator. When the buoys rise by the thrust of the waves, the vessel also tends to rise. To prevent this movement of the vessel, that is, to maintain the vessel in its place, it must be ballasted with a weight, so that the ascending movement of the buoys is transmitted directly on the arms, thus transmitting sufficient energy.

The system that is the object of the invention is characterized in that it consists of:
at least one vessel carrying at least one rotor shaft on each side which acts on an electricity generator; said rotor shafts being placed on each side of port and starboard of the vessel;
At least one tank joined to the vessel and filled with sea water so that they are exactly at the waterline in a state of rest with no waves;
At least one buoy, on each side of port and starboard, and
Mechanical means of free wheels or ratchets to transmit the movement to the corresponding rotor shaft.

In a preferential embodiment, it is also characterized in that the vessel is fastened to at least one float frame, to which one or several of said tanks are joined; they are filled with sea water so that the float frame is exactly at the height of the vessel's waterline.

An aspect included in the object of the invention is that joined to the float frame are several vessels; that several float frames are joined to each other, as well as that said tanks that are filled with water are placed, indistinctly on the vessel (or vessels if there are several) and/or in the float frame (or float frames if there are several).

According the proposed system, the ballast which gives weight to the vessel is the sea water itself, as it weighs more than the air and it can be utilized, for this purpose, on both sides of the vessel we place water tanks exactly at the height of the waterline and totally joined to the same. Once the generator plant is at sea the tanks are filled with sea water and the lateral arms are extended with their corresponding buoys. These buoys will rise and fall, transmitting the movement to the shaft of the vessel. At that time the vessel will tend to rise by the force of the buoys and the retention of the shaft that acts on the generator; at that time, the tanks filled with water that are immediately below the water line will also rise. These tanks, when the water comes out add their weight to that of the vessel, increasing the resistance to the arm of the buoys whose effort is transmitted to the shafts that act on the generator.

The great advantage of this system is that it is not necessary to previously install substantial counterweights to maintain the reference point. Moreover, they are easy to transport, and once it is in the water, the structure is anchored and the filled deposits are already producing energy.

Another important advantage of this system is that it makes it possible to generate power regardless of the position taken by the vessel due to the wind and/or sea currents; thus, its anchoring to the sea floor is not problematic.

Therefore, the content of this application constitutes a new invention that involves inventive activity, and can be used for industrial application.

To better understand the object of this invention, a preferential form of practical embodiment is represented in the drawings, subject to accessory changes that do not essentially alter it.

Figure 1:
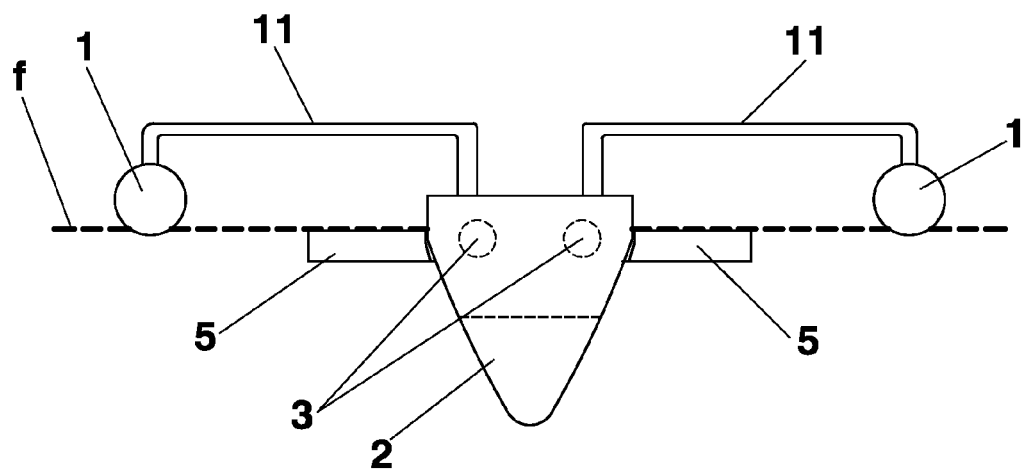
FIG. 1 is a general diagram of the system that is the object of the invention, in resting position, to observe its principle of operation.

The following is an example of practical, non-limiting embodiment, of this invention. Other modes of embodiment in which accessory changes have been introduced which do not essentially alter it, have in no way been disregarded; on the contrary, this invention, also encompasses all its variations.

In conformity with the invention, the system of power generation from sea wave movement which is the object of the invention includes basically;
At least one buoy (1);
At least one vessel (2);
At least one rotor shaft (3);
At least one float frame (4); and
At least one tank (5)—.

According to the invention, the vessel (2) carries at least one rotor shaft (3) on each side; that is, one rotor shaft (3) on the port side and other rotor shaft (3) on the starboard side of the vessel (2). Said rotor shafts (3) act on an electricity generator.

The vessel (2) carries joined to it, at least one tank (5). Each tank (5) is filled with sea water, so that, in a state of calm (without waves), the tanks (5) are exactly at the height of the waterline (f). See FIG. 1.

According to the invention, there is also at least one buoy (1) on either side of the vessel (2); that is, one buoy (1) on the port side and another buoy (1) starboard. Said buoys (1) are joined to the vessel (2). The buoys (1), logically, are also at the height of the waterline (f). See FIG. 1.

In addition, the vessel (2) is fastened to float frames (4).

Among other aspects, the following are indistinct and accessory for the purposes of the invention:

The tank (5), the tanks (5) or some of the tanks (5) are joined to the vessel (2) or to the float frame (4);

the float frame (4) or each float frame (4) are joined to one or several vessels (2);

There is a single float frame (4), or several float frames (4) joined to each other.

Figure 2:
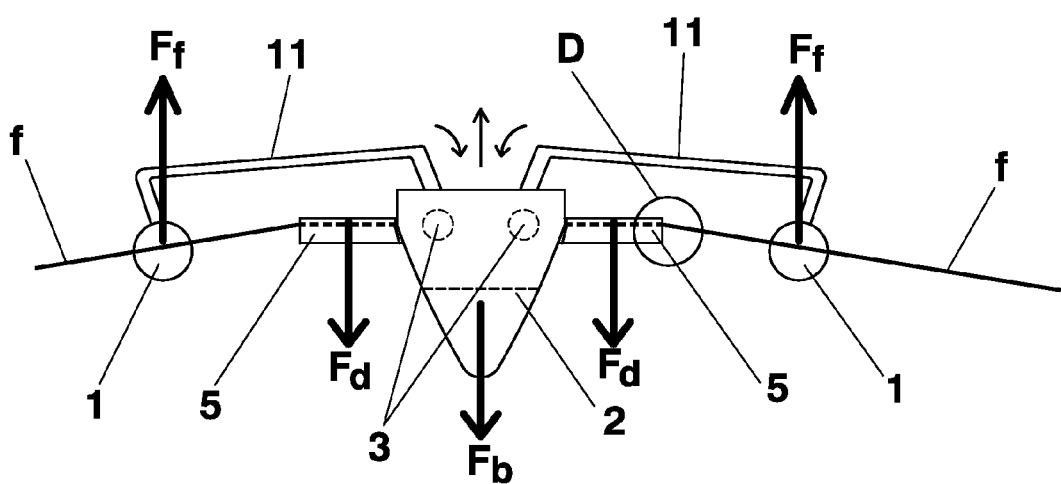
FIG. 2 is a general diagram, similar to the foregoing figure, in working position, representing the different acting forces of the vessel (2) -Fb-, of the tanks (5) -Fd- and of the buoys (1) -Ff- as well as its directions of action.
Figure 3:
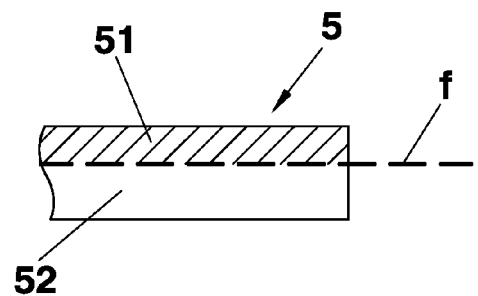
FIG. 3 is an enlarged detail according to indication D of FIG. 2, in which there is a partial representation of a full tank (5) with its masses of water (51), (52) which respectively are above and below the waterline. (f).
Figure 4:
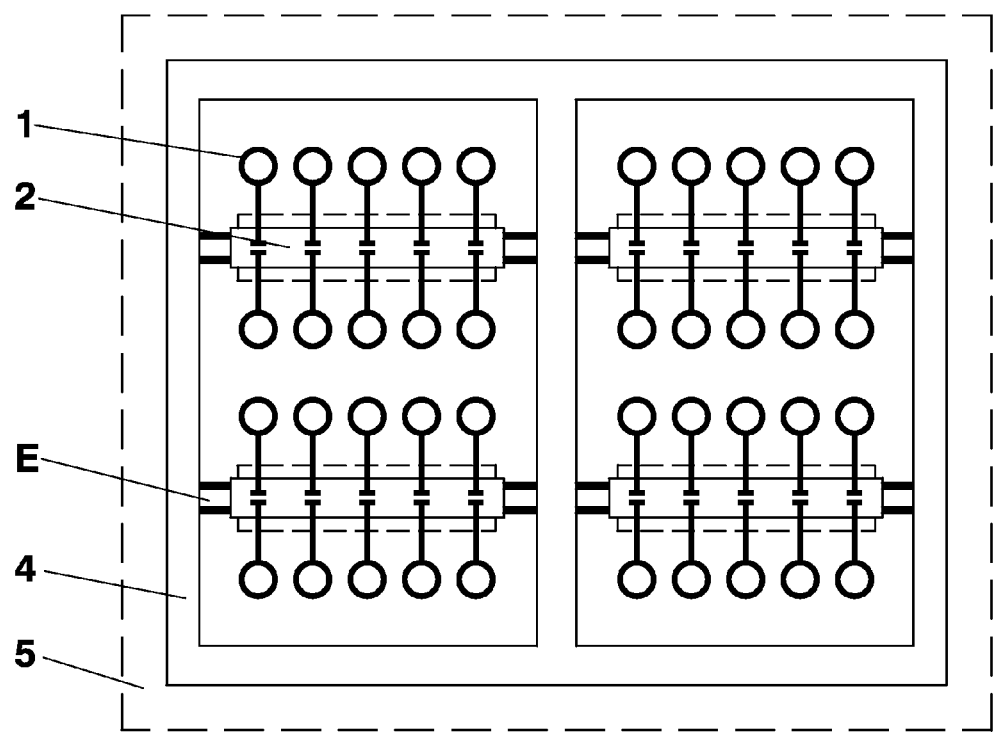
FIG. 4 is a general diagram of an example of embodiment which includes several vessels (2) fastened to a common structure (E) to which the float frame (4) is joined, which in turn carries attached to it the tank (5).
Figure 5:
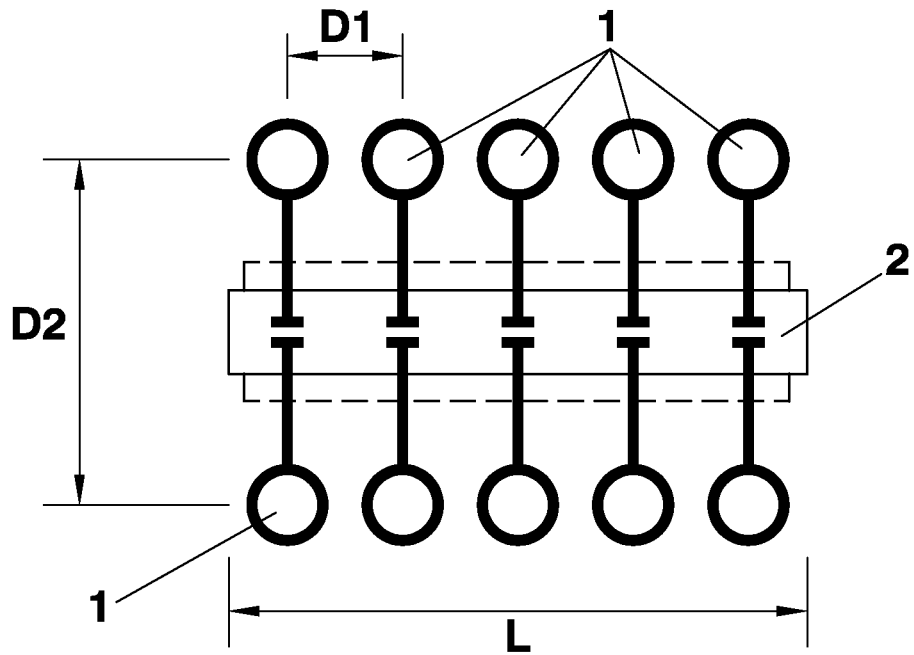
FIG. 5 is a partial and unitary representation of FIG. 4, indicating the distance (D1) between buoys (1) of the same side of a vessel (2); the distance (D2) between buoys (1) on both sides of a vessel (2) and the total length (L) of said vessel (2).
Figure 6:
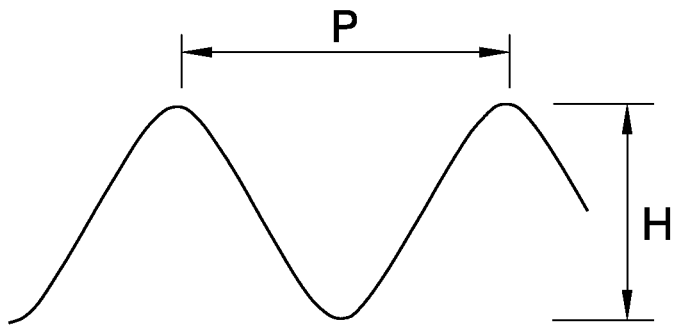
FIG. 6 is a graphic representation of the dimensioning of a wave, with its height (H) and its period (P) which for a typical wave are, respectively, 2 meters and 15 meters.

In a calm sea (with no waves) power is not generated (see FIG. 1) but when the waves rise forces are generated in different directions (see FIG. 2): the vessel (2) generates force (Fb) downwards; the tanks (5) loaded with water generate forces (Fd), also downwards; and the buoys (1) generate forces (Ff) upwards, transmitting their movement to the respective rotor shaft (3) through the respective arm (11).

Between said arms (11) and their rotor shaft (3) there are the mechanical means to transmit the movement from the buoy (1) to the rotor shaft (3) in a single direction (in that direction, but not in the opposite direction). Those mechanical means used, which are free wheels or ratchets (with or without pulley blocks) are not described (as they are known).

For the dimensioning of the system according to the invention, it is taken into account that the waves have periods (P) that vary depending on their height (H) and that value of the period (P) of the wave is taken as a reference.

The distance (D1) between the buoys (1) of both sides can be half of that period (P).

The distance (D2) between both sides can be the period (P) itself or multiples of half of the period (P).

The length (L) of the vessel (2), in principle, must be equal to or greater than the period (P) of the wave, in order to integrate the movements of the waves, so that together with the tanks (5), it is a solid reference point.

To have an idea of the dimensions of the system, we shall take as an example waves 2 meters in height (H) (which are normal on our coasts). The typical period (P) of these waves is 15 meters. Therefore, the distance (D1) can be 7.5 meters, the distance (D2) 15 meters (or multiples of 7.5 meters) and the length (L) of the vessel (2) equal to or greater than 15 meters.

The basic principle of operation of the system that is the object of the invention is that, when the waves go down, the buoys (1) descend freely by their own weight and when the wave rises, it pushes the buoy (1) upward. Applying the theorem of Archimedes, the buoy (1) produces force which is transmitted through a system of free wheels or ratchets to a rotor shaft (3) which acts on the generator. This system of free wheels allows the force of the buoy (1) on the rotor shaft (3) to be only when they rise, being freed on going down. The movement of the buoys (1) of one side of the vessel (2), cause their corresponding rotor shaft (3) to turn in one direction, while the buoys (1) of the other side make their corresponding rotor shaft (3) turn in the opposite direction. In this way, to join the force of both rotor shafts (3) and act on the generator, previously the turning direction of one of them must be reversed.

The known principle of operation of the transmission of movement through free wheels or ratchets (which, in addition, is not the object of the invention) is not described in greater detail (or is represented in the figures).

The materials, dimensions, proportions and in general, those other accessory or secondary details that do not essentially alter, change or modify it can vary.

The terms in which this report is written are a true and accurate reflection of the object described, and must be taken in their broadest sense and never in a limiting manner.

The invention claimed is:

1. System for generation of energy from ocean wave movement, comprising:
    a) at least one vessel (2) carrying at least one rotor shaft (3) that acts on an electrical generator, the vessel being elongate and having two lateral elongated sides extending along a length of vessel
    b) at least one tank (5) on each of the lateral elongated sides of the vessel (2), joined to the vessel (2) and filled with sea water so that so that they are exactly at the height of the waterline (f);
    c) at least one buoy (1) joined to the vessel (2), by an arm (11) extending laterally relative to the vessel; and
    d) free wheels or ratchets to transmit the movement of each buoy (1) to the corresponding rotor-shaft (3).

2. System for generation of energy from ocean wave movement, according to claim 1, wherein the vessel (2) is fastened to a float frame (4).

3. System for generation of energy from ocean wave movement, according to claim 1, wherein at least one buoy (1) is disposed on each port and starboard side of the vessel (2).

4. System for generation of energy from ocean wave movement, according to claim 1, wherein at least one rotor shaft (3) is disposed on each port and starboard side of the vessel (2).

5. System for generation of energy from ocean wave movement, according to claim 2, wherein the tanks (5) full of sea water are joined to the float frame (4) so that the float frame is exactly at the height of the waterline (f).

6. System for generation of energy from ocean wave movement, according to claim 5, wherein several vessels (2) are jointed to the float frame (4).

7. System for generation of energy from ocean wave movement, according to claim 6, wherein several float frames (4) are joined to each other.

8. System for generation of energy from ocean wave movement, according to claim 1, wherein the tanks (5) are separate from the vessel (2) and are attached to the vessel (2).

9. System for generation of energy from ocean wave movement, according to claim 2, wherein a further tank (5) full of sea water is joined to the float frame (4) so that the float frame is exactly at the height of the waterline (f).

* * * * *